(12) United States Patent
Niessen

(10) Patent No.: US 6,568,422 B2
(45) Date of Patent: May 27, 2003

(54) VALVE LOCKING MECHANISM AND METHOD

(76) Inventor: Leopold J. Niessen, 83 Western Way, P.O. Box 876, Gosport, Hampshire PO12 2NF (GB)

(*) Notice: Subject to any disclaimer, the term of this patent is extended or adjusted under 35 U.S.C. 154(b) by 0 days.

(21) Appl. No.: 09/908,025

(22) Filed: Jul. 18, 2001

(65) Prior Publication Data

US 2002/0074041 A1 Jun. 20, 2002

Related U.S. Application Data

(63) Continuation-in-part of application No. 09/736,618, filed on Dec. 14, 2000.
(60) Provisional application No. 60/299,282, filed on Jun. 19, 2001.

(51) Int. Cl.[7] .............................................. F16K 35/00
(52) U.S. Cl. ...................... 137/385; 251/112
(58) Field of Search .................... 137/385; 251/112; 92/17, 18, 20

(56) References Cited

U.S. PATENT DOCUMENTS

| | | | | | |
|---|---|---|---|---|---|
| 4,295,630 A | * | 10/1981 | Card et al. | ..................... | 251/14 |
| 5,139,230 A | * | 8/1992 | Lester | ........................ | 251/285 |
| 5,236,172 A | * | 8/1993 | Friemoth et al. | ........... | 137/385 |
| 5,259,589 A | * | 11/1993 | Posner | ....................... | 251/285 |

OTHER PUBLICATIONS

Brochure for QTRCO entitled "316 Stainless Steel Rack & Pinion Quarter–Turn Actuators" (Not Dated).*
Brochure for Air Torque entitled "Design and Construction," with color diagram of a 4th Generation rack and pinion pnematic actuator (Not Dated).*
Brochure for UniTorq containing technical information and a labeled diagram regarding M–series materials (Not Dated).*
Brochure for Dynactair actuators with labeled diagram in color, showing internal construction of actuators (Not Dated).*
Brochure for Mecair located via Prealpi, 30—20032 Carmano (Milano) Italy, entitled "Rack and Pinion Actuators with Travel Stop Adjustment in Both Directions," showing a labeled diagram in color of SuperNova Series Design Benefits (Not Dated).*
Brochure with Figure 79U/E/D Pneumatic Actuator showing labeled diagram in color and materials of construction (Not Dated).*
Brochure showing a labeled diagram in color of a Radius actuator, including direct mount limit switch, direct mount positioner, and direct mount pilot solenoid (Not Dated).*
Brochure by Hytork showing a labeled diagram in color of an actuator, including safety components (Not Dated.
Brochure by G.H. Bettis showing a labeled diagram in color on p. 3 of an actuator, including BettisGuard, Namur accessory interface and the like (Not Dated).

* cited by examiner

Primary Examiner—Edward K. Look
Assistant Examiner—Thomas E. Lazo
(74) Attorney, Agent, or Firm—Kenneth L. Nash

(57) ABSTRACT

The present invention provides an improved lock mechanism and method for high security locking of a valve in a desired position. A moveable locking member is operably mounted within a housing for moving between a locking position and an operating position. The housing preferably defines a lock hole into which a pad lock or the like can be inserted into the lock hole to secure the locking member in the locking position. A retainer member is preferably provided to prevent the locking member from being easily removed from the housing. The retainer member is preferably mounted such that an external lock cannot be inserted when the valve is not locked into the desired position. In a preferred embodiment, the locking member is incorporated into the end stop mechanism for the actuator, which is preferably adjustable and preferably is a dual end stop mechanism.

35 Claims, 8 Drawing Sheets

VALVE LOCKING MECHANISM AND METHOD

This application is a continuation-in-part application of U.S. Utility patent application Ser. No. 09/736,618 filed Dec. 14, 2000 and also claims priority of U.S. Provisional Patent Application Ser. No. 60/299,282 filed on Jun. 19, 2001.

TECHNICAL FIELD

The present invention relates generally to an improved valve or valve actuator and, more specifically, to a locking mechanism for a valve to prevent inadvertent operation thereof.

BACKGROUND ART

Valves are known to be used for controlling many different types of fluids, such as gases and liquids. In some cases, such fluids are highly corrosive, acidic, dangerous, and/or require extreme caution. For controlling these types of fluids, it may be desirable, and is sometimes required by safety regulations, such as OSHA regulations or other regulations, to provide means for preventing accidental operation of the valves. Preferably a padlock or a special type of padlock with a dual key locking mechanism may be utilized. Rotary valves may be especially inconvenient to lock and may require extensive modification to provide suitable locking arrangements. There may be problems with prior art locking arrangements whereby a valve can inadvertently be locked into the wrong position and where the valve may appear locked but is not actually locked.

The prior art discussed above does not provide a rotary valve locking mechanism that may be readily incorporated into a valve without modifications to the valve or a suitable valve actuator with a locking mechanism. Locking mechanisms may be difficult to incorporate into a valve without the use of additional seals and/or other elements that may deleteriously affect operation of the valve. It is also desirable that the valve assembly including any valve actuators be as compact as possible. Consequently, there remains a need to provide a highly reliable and compact valve locking apparatus and method. Those of skill in the art will appreciate the present invention which addresses the above and other problems and long felt needs.

SUMMARY OF THE INVENTION

Accordingly, it is an objective of the present invention to provide an improved valve locking mechanism.

Another object of the present invention is to provide an improved lock that may be designed to lock the valve in only one position, depending on construction, which may be either the open position or the closed position.

Yet another object of the present invention is to provide an improved valve locking mechanism that requires no modifications to the valve with which the valve lock is utilized.

Therefore, a valve locking mechanism is provided which is operable for locking a rotary valve actuator into a selected position wherein the rotary valve actuator comprises a moveable actuator element moveable between a first position and a second position. The valve locking mechanism may comprise one or more elements such as, for instance, a housing for the moveable element and a valve lock element moveable within the housing between a valve operate position and a valve locked position. Preferably, the valve lock element may be in contact with the moveable actuator element of the rotary actuator in the valve locked position to thereby prevent movement of the moveable actuator element between the first position and the second position. Moreover, the valve lock element preferably has a clearance relationship with respect to the moveable actuator element of the rotary actuator in the valve operate position such that the valve lock element then permits movement of the moveable actuator element between the first position and the second position.

Other elements may include a lock hole through the path suitable for an insertable locking device. In a preferred embodiment, the lock hole may be positioned along the path such that when the insertable locking device is inserted within the lock hole then the valve lock element is prevented from moving from the valve locked position to the valve operate position. The valve lock element may block the lock hole for the insertable locking device when the valve lock element is in the valve operate position.

The valve locking mechanism may further comprise a valve lock retainer element mounted at one end of the path to restrict movement of the valve lock element and to thereby prevent removal of the valve lock element from the housing through the one end of the path.

In one embodiment, the housing comprises an actuator housing for the rotary actuator defining a pressure containment region therein sealed for containing pressure. The valve lock element may be disposed within the pressure containment region or the valve lock element may be disposed outside of the pressure containment region. In another embodiment, the housing comprises an adaptor plate.

Thus the present invention may comprise a locking mechanism operable for locking and unlocking a rotary valve actuator wherein the rotary valve actuator comprises a rotary shaft rotatable between a first rotary position and a second rotary position. A first rotary valve actuator member may be connected for movement with the rotary shaft wherein the first rotary valve actuator member may have a first stop surface. The first rotary valve actuator member may comprise a piston operatively connected to the rotary shaft. Alternatively, the first rotary valve actuator member may be mounted to the rotary shaft for rotation with the rotary shaft. The valve lock element may then lockingly engage the first rotary valve actuator member in the valve locked position to prevent rotation of the rotary shaft between the first rotary position and the second rotary position. A second stop surface may be affixed with respect to the rotary shaft whereby the first stop surface and the second stop surface are engageable with each other to limit rotational movement of the rotary shaft. In a preferred embodiment, the valve lock element engages the first stop surface in the valve lock position. Other elements may include an adaptor plate for the rotary valve actuator wherein the valve lock element may be mounted within the adaptor plate.

A method is provided for assembling a valve locking assembly operable for locking a rotary valve actuator into a selected position wherein the rotary valve actuator comprises a moveable actuator element which is moveable between a first position and a second position. The method may comprise one or more steps such as, for instance, mounting a locking element within a housing for movement along a path defined within the housing between a valve locked position and a valve operate position, providing that the actuator moveable element is prevented from movement between the first position and the second position when the locking element is in the valve locked position, and mounting a retainer along the path to limit movement of the locking element.

Other method steps may include providing that the locking element is engageable with the retainer when the locking element is in the valve operate position, and/or providing a hole transverse to the path within the housing for insertion of an insertable lock into the hole to prevent movement of the locking element when the locking element is in the valve locked position, and/or providing that the locking element blocks the hole transverse to the path to prevent the insertable lock from being inserted into the hole when the locking element is in the valve operate position.

Other steps may also include utilizing the housing as a valve adaptor plate for mounting of the rotary actuator and/or utilizing the housing as an actuator housing and/or sealing the actuator housing to provide a pressure-sealed zone within the actuator housing for containing pressure. Additional steps may include mounting the locking element within the pressure sealed zone or mounting the locking element outside of the pressure-sealed zone.

In other words, yet another embodiment of a locking mechanism is provided that is operable for locking a valve and a valve actuator into a selected position. The locking mechanism may comprise one or more elements such as, for instance, an end stop for the valve actuator comprising a moveable member with a first moveable stop surface and a second affixed stop surface, and a valve lock element, the valve lock element being moveable between a valve operate position and a valve locked position, the valve lock element engaging the first moveable stop surface in the valve locked position.

In yet another embodiment, the invention may comprise elements such as, for instance, a valve lock element a valve lock element, the valve lock element being moveable between a valve operate position and a valve locked position, the valve lock element engaging a moveable actuator element in the valve locked position, a housing for the valve lock element, the housing defining a lock hole for a locking device, and a valve lock retainer element mounted to prevent removal of the valve lock element.

In operation, a method is provided for locking a valve into a selected position utilizing an insertable lock. The method comprises one or more steps such as, for instance, mounting a locking element for movement with respect to an actuator housing between a valve locked position and a valve operate position, and mounting a retainer with respect to the locking element such that the locking element is prevented from being removed when the insertable lock is removed.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

Figure 9:
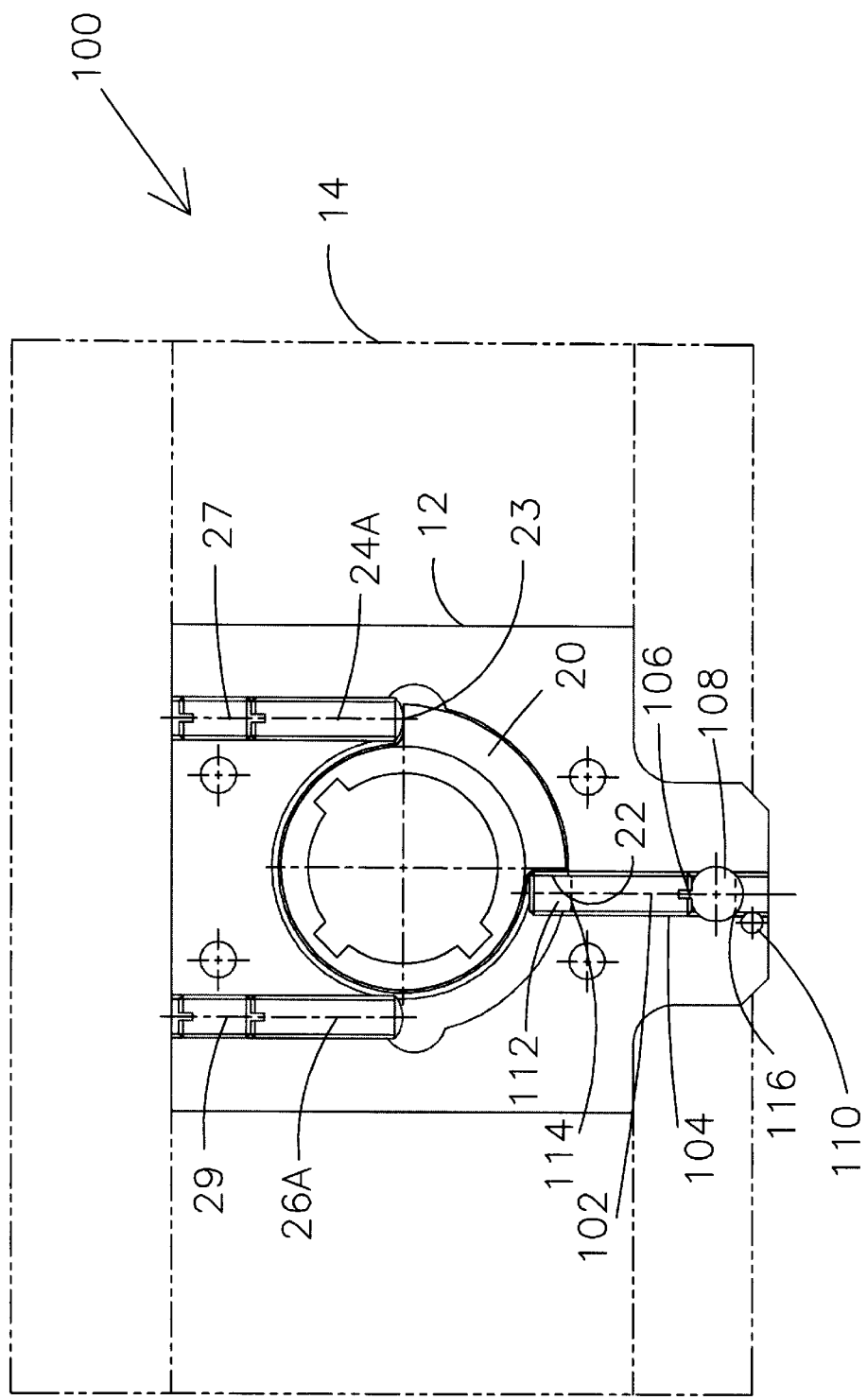
FIG. 9 is an elevational view, partially in phantom lines, of a closed valve locking mechanism in accord with the present invention.
Figure 10:
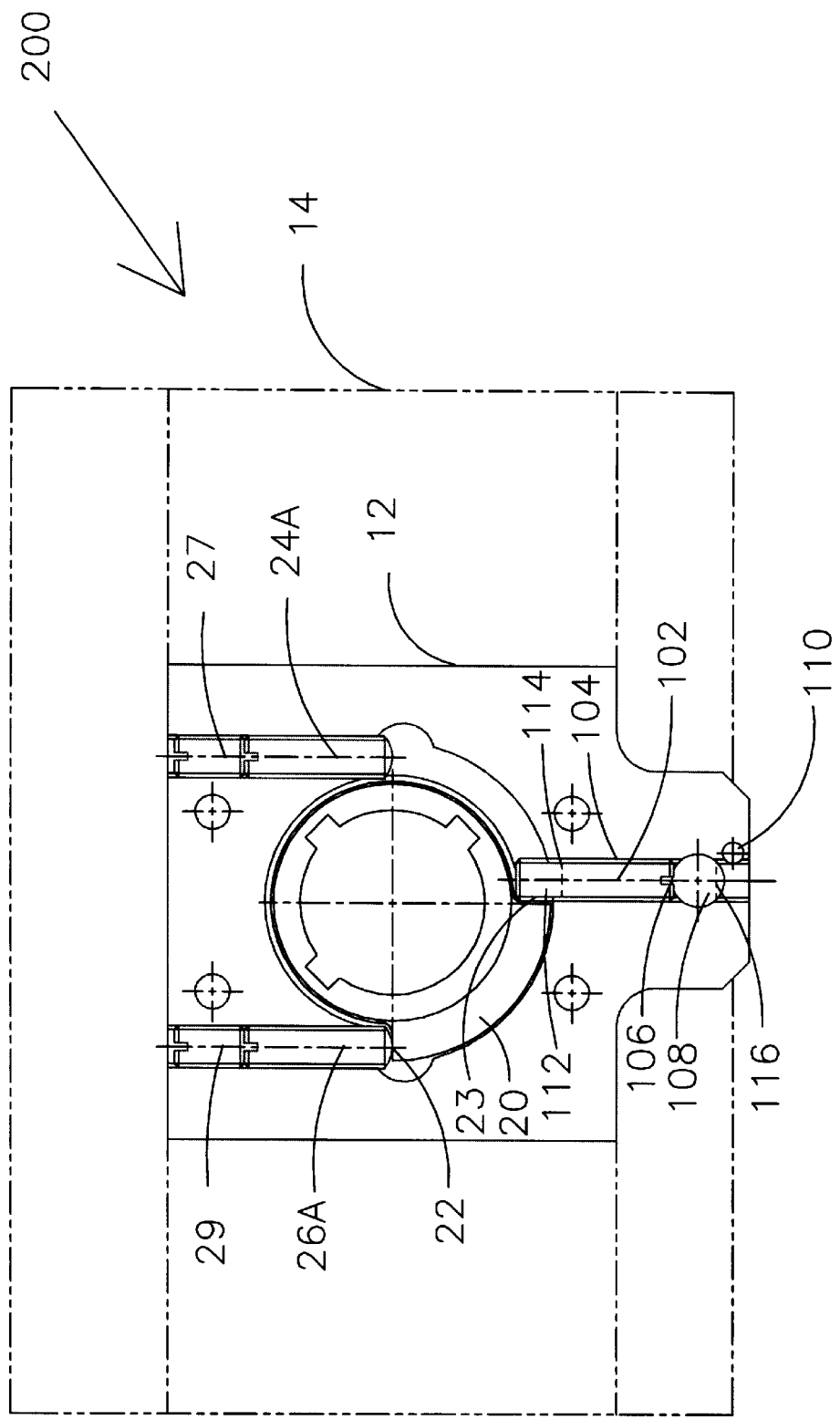
FIG. 10 is an elevational view, partially in phantom lines, of an open valve locking mechanism in accord with the present invention.

In a presently preferred embodiment of the present invention, the valve locking mechanism is provided externally to the valve and thereby avoids the need to modify the valve. Preferably, the valve locking mechanism is part of the actuator such as, for instance, the adaptor plate between the valve and the actuator and/or comprises an additional feature within an end stop mechanism. However, the valve locking mechanism may be located at other positions in the valve actuator, if desired. Moreover, in a preferred embodiment, the valve locking mechanism is designed to work within a non-pressurized portion of the actuator to avoid the need for additional seals and to avoid the possibility of leaks if the seals should fail. However, the locking mechanism of the present invention could be incorporated into pressurized regions of the actuator, if desired. In the presently preferred embodiment, the valve locking mechanism is incorporated into the valve end stop mechanism and preferably utilizes the features of the end stop mechanism for locking purposes. However, many features of the present invention could be utilized outside of the valve stop end mechanism, if desired, such as with other moving components of an actuator including the actuator pistons, shaft, and the like. FIG. 9 and FIG. 10 disclose presently preferred locking mechanisms 100 and 200 utilized with a preferred and exemplary embodiment dual end stop mechanism which is discussed in more detail hereinafter. However, the present invention may be used with any end stop mechanism. Such end stop mechanisms may typically include an adjustable member for setting the end stop of the valve. A dual end stop mechanism may typically include two adjustable end stop elements for setting both open and closed end stops for a valve. The end stop mechanism further includes a surface that is engaged by the end stop elements such as a cam or other structure. Thus, an end stop mechanism in accord with the present invention includes any combinations of surfaces that limits travel or rotation to thereby stop movement of the valve in either the open or the closed position or both. Stop mechanisms in accord with the present invention may also operate directly with an actuator piston or other moving elements of an actuator. It will also be understood after a review of the description and drawings that the locking mechanism of the present invention includes features that may be used separately from the end stop mechanism, if desired, even though the preferred embodiment is very conveniently incorporated into the end stop mechanism to provide a compact and highly reliable valve locking mechanism as explained in detail hereinafter.

Figure 1:
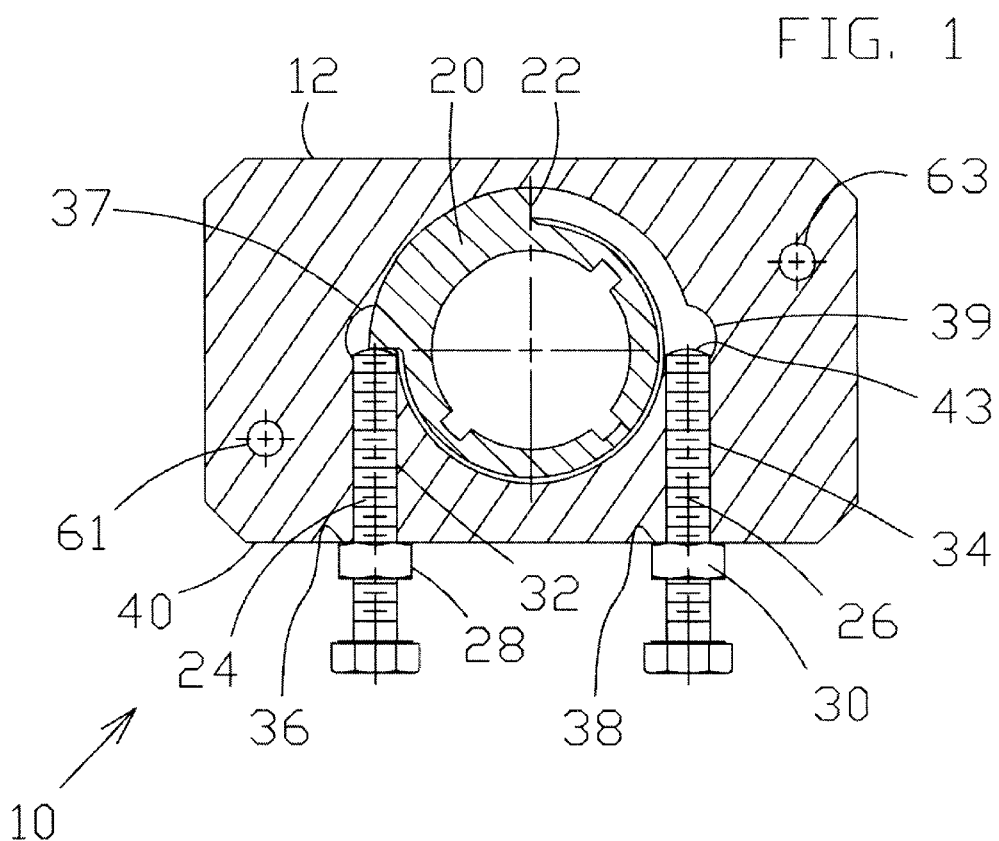
FIG. 1 is an elevational view, partially in section, of a stop assembly housing or adaptor plate in accord with the present invention shown in a first rotational stop.
Figure 2:
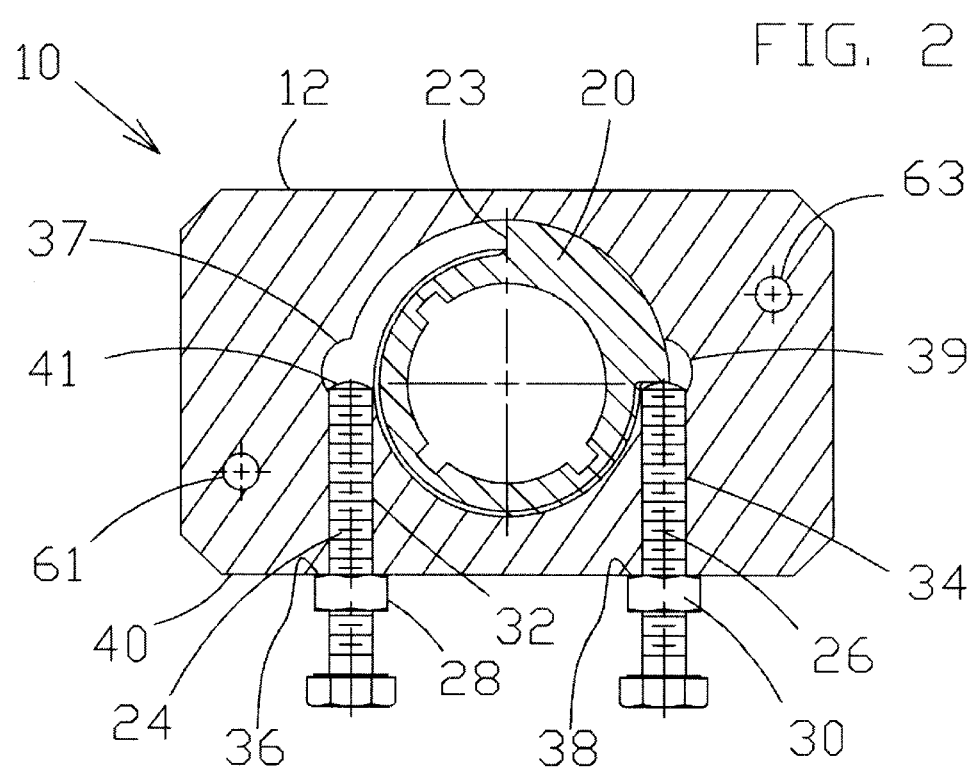
FIG. 2 is an elevational view, partially in section, of the stop assembly housing or adaptor plate of FIG. 1 in a second rotational stop position.
Figure 7:
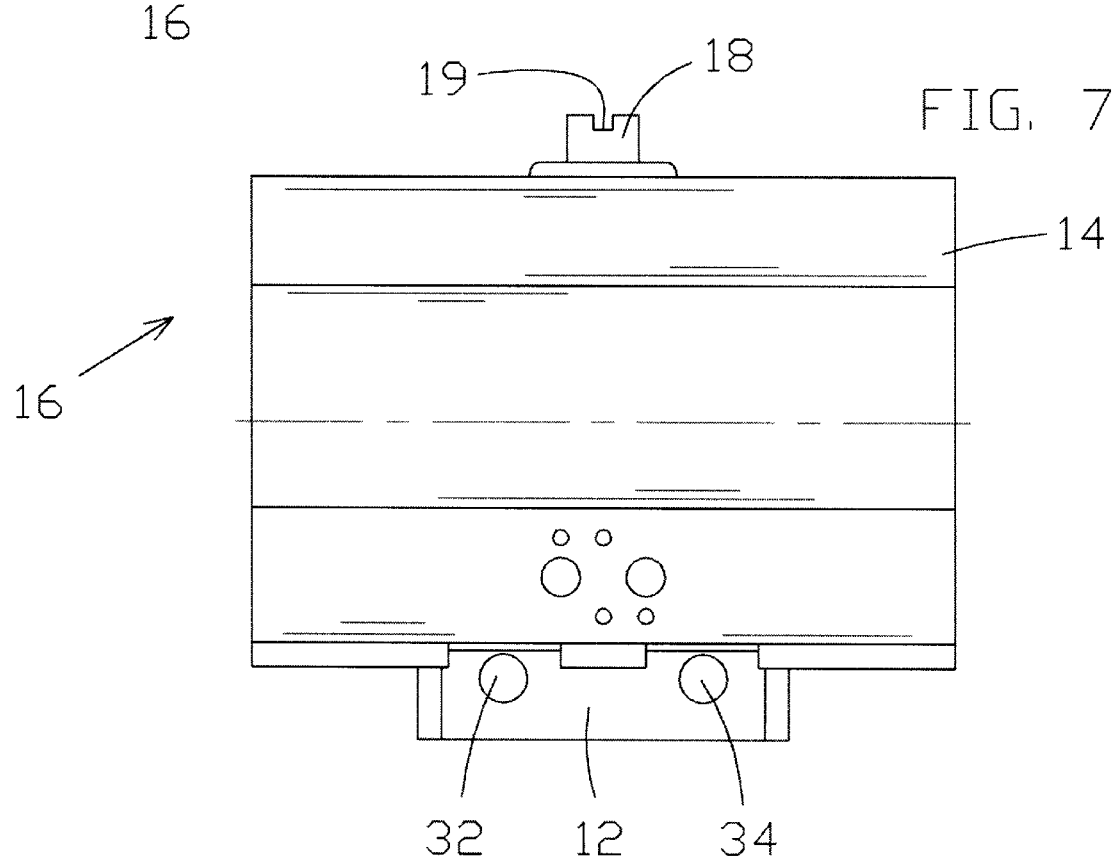
FIG. 7 is an elevational view, of an actuator with apertures in the stop assembly housing for adjustment of the stop positions.
Figure 8:
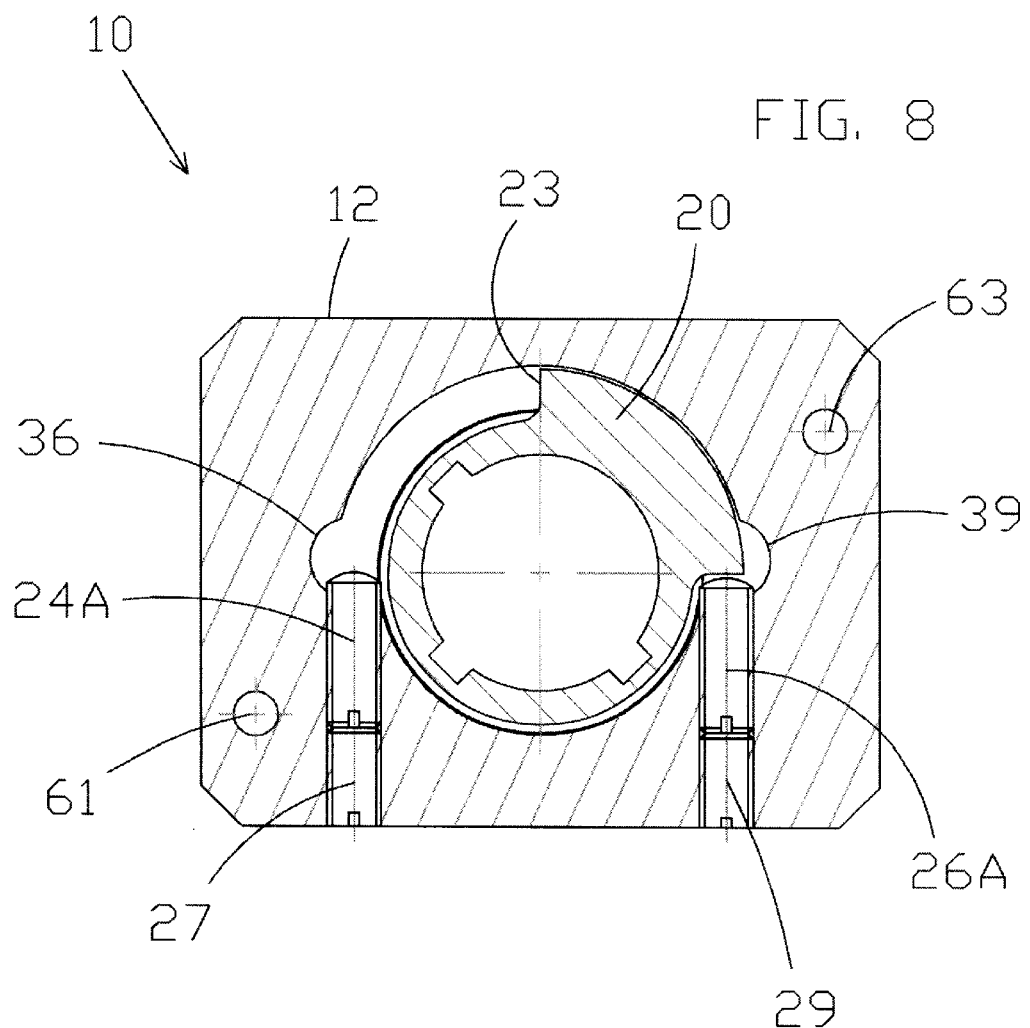
FIG. 8 an elevational view, partially in section, of another embodiment of a stop assembly housing or adaptor plate in accord with the present invention.

Referring now to the drawings, and more particularly to FIG. 1, FIG. 2, and FIG. 8, there is shown an exemplary dual end stop 10 for use in explaining the preferred environment of the present invention. Dual end stop 10 includes adaptor plate or stop assembly housing 12 which preferably is used to house the various dual end stop components in accord with a preferred embodiment of the invention. Stop assembly housing 12 may also act as an adaptor plate to provide a connection or mounting between actuator housing 14, shown in FIG. 4, FIG. 5, FIG. 6, and FIG. 7, and the various types of valves (not shown) which actuator 16 may be mounted to.

Figure 3:
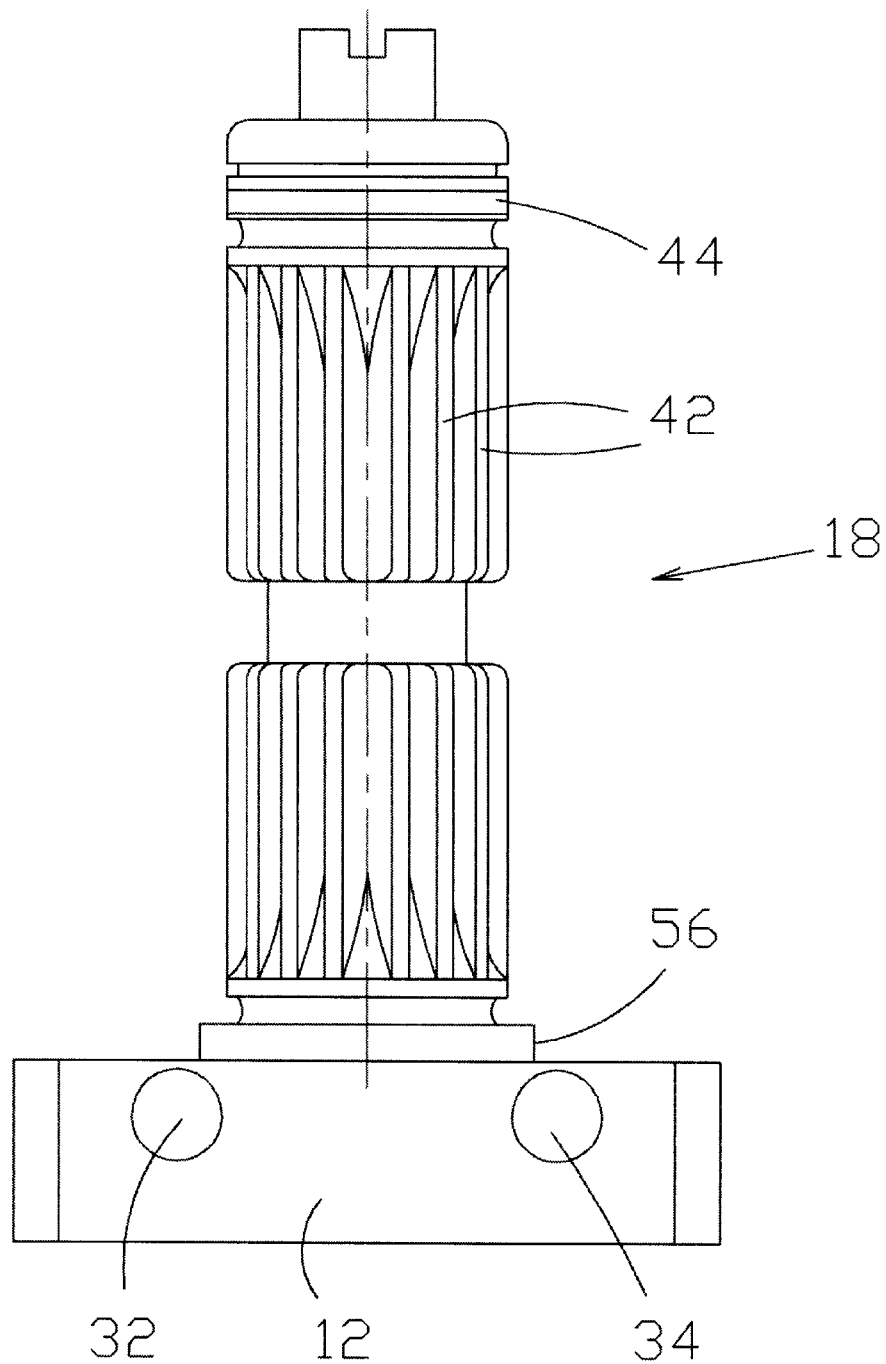
FIG. 3 is an elevational view of a drive shaft mounted on a stop assembly housing in accord with the present invention.
Figure 4:
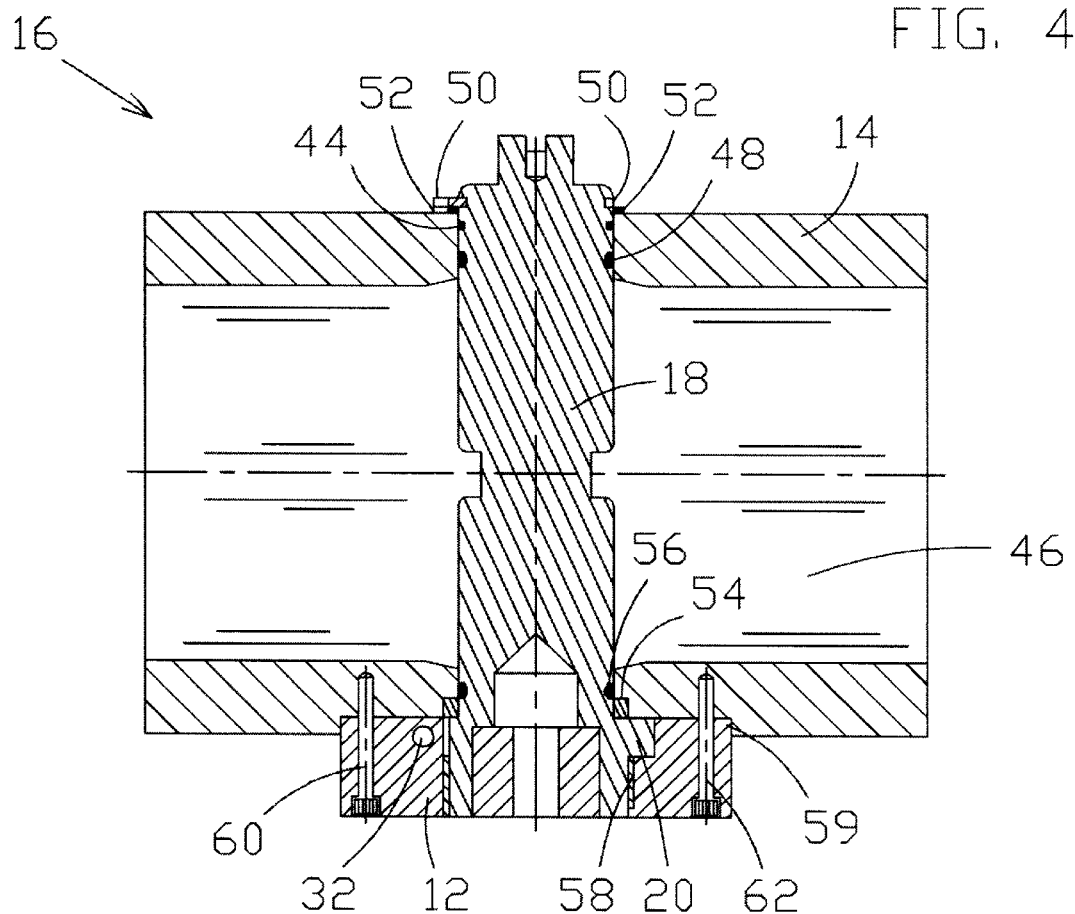
FIG. 4 is an elevational view, partially in cross-section, along sectional view lines 4—4 of the actuator shown in FIG. 5.

It is well known that actuator pistons within actuator housing 14 may be used to activate rotary drive element 18, as shown in FIG. 3 and FIG. 4, to rotate in one direction, such as for a quarter turn, and then in the other direction by the same amount to thereby effect opening and closing of the valve. Mounted to or monolithic with rotary drive element 18 is cam member 20 which acts as a stop element affixed to rotary drive element 18. Other shapes and configurations of a stop element such as cam member 20 could also be used. Essentially, a stop element or stop element assembly for dual end stop 10 should comprise at least two stop surfaces, such as first stop surface 22 and second stop surface 23. Rotary drive element 18 and cam 20 then may rotate between a first rotational position as shown in FIG. 1, and a second rotational position as shown in FIG. 2. First and second rotational positions of cam 20 correspond with an open/closed position of the valve. For instance, the position of FIG. 1 may correspond to an open valve and the position of FIG. 2 may correspond to a closed valve.

Dual end stop 10 may be used to accurately set the open and closed position of the valve. For instance, in one embodiment a first stop member such as stop adjustment bolt 24 and a second stop member such as adjustment bolt 26 may be adjusted by about plus and minus two and one-half degrees thereby providing a range of travel for a rotary drive of a quarter-turn actuator, such as rotary drive 18, and the corresponding valve drive shaft, of a range of movement between about eighty degrees and one hundred degrees. Depending on the actuator design and valve operational requirements, a somewhat greater range of adjustment for each stop member could be provided if desired, for instance, about plus and minus five degrees. For convenience of operation, stop adjustment bolts 24 and 26 are threaded bolts although other adjustable members could be used that may include gears, ratchets, and the like that may provide the sufficiently fine adjustments required to set the stops. In a presently preferred embodiment, lock nuts 28 and 30 are used to lock stop adjustment bolts in position to prevent further rotation once the desired stop settings are made. In another embodiment of the invention as shown in FIG. 8, adjustment bolts 24A and 26A are provided in a manner such that the adjustments are tamper resistant. Adjustment bolts 24A and 26A are not immediately available for adjustment thereby reducing the likelihood that inadvertent adjustment might be made by personnel. In this case, in line lock bolts 27 and 29 are used to lock the position of adjustment bolts 24A and 26A, respectively. Lock bolts 27 and 29 cannot be used to make adjustments. Preferably, lock bolts 27 and 29 extend only slightly, if at all, from stop assembly housing 12 to further discourage unneeded adjustments.

A preferred embodiment of the present invention utilizes several different special features to prevent any deformation of stop adjustment bolts 24 and 26 and/or their mounting within stop assembly housing 12. Stop adjustment bolts 24 and 26 are preferably manufactured from high tensile steel.

Preferably stop adjustment bolts 24 and 26 and the corresponding apertures in which they are inserted, such as threaded apertures 32 and 34, are designed for full thread engagement and minimum overhang of stop adjustment bolts 24 and 26 with respect to threaded apertures 32 and 34. For those prior art actuators which may use a rotating stop member, such as cam 20, full thread engagement is not provided. The prior art adjustment bolts extend through the pressurized zone for engaging the stop surfaces and are supported by the actuator housing which is often required to be compact for suitable mounting to the valve. Thus, there is much less support for rotary stop members. On the other hand, the present invention preferably utilizes a separate stop assembly housing preferably mounted outside of the pressurized zone wherein the stop assembly housing preferably doubles as the adaptor plate to provide a compact design. Therefore, adjustment bolts 24 and 26 as well as threaded apertures 32 and 34 can preferably be designed for a minimum overhang. As a general matter, the length of each adjustment bolt 24 and 26, which extends from initial openings 36 and 38 at side wall 40 into stop adjustment housing 12, are threadably engaged for about 95% of this length. Preferably at least 80% of this inserted length of each adjustment bolt 24 and 26 is threadably engaged within threaded apertures 32 and 34. This additional support as compared to prior art designs eliminates any possible deformation or warping of either the adjustment bolts or their associated support structure to thereby provide a more stable dual stop setting adjustment. Thus, the features providing a separate stop assembly housing and of positioning the stop adjustment bolts outside of the pressurized zone within actuator housing 14 for a pneumatic actuator, as further discussed in more detail hereinafter, has significant long term benefits related to more stable stop setting adjustments.

Another preferred feature of the present invention is spherical, convex, rounded, and/or tapered bolt heads or bolt ends 41 and 43 for each respective adjustment bolt 24 and 26. This structure is selected to produce a defined contact point between first and second stop surfaces 22 and 23 and the corresponding stop adjustment bolts 24 and 26. By providing a defined and centralized point contact, load distribution is more uniform and less contact stress occurs on the mating faces. This design avoids the problems of prior art flat head bolts where there is a possibility of a random point contact associated with flat head bolts that may result in a random contact face deformation leading to changing stop adjustment settings as well as random load distribution. Various tapering designs for bolt ends 41 and 43 could be used although a spherical or convex profile is presently preferred.

Relief grooves 37 and 39 are provided adjacent bolt ends 41 and 43, respectively, to thereby reduce stress in plate or stop assembly housing 12. The large blend radius of relief grooves 37 and 39 avoids stress concentrations at the loaded bolt, the adjacent restraining bolt holes 61 and 63, and the edge of threaded apertures 32 and 34. This in turn avoids the possibility of fatigue cracks propagating and ensures the present design has a superior fatigue life. In one finite analysis test, this design suggests the possibility of more than fifty million cycles of repeated loadings without failure due to fatigue.

Figure 5:
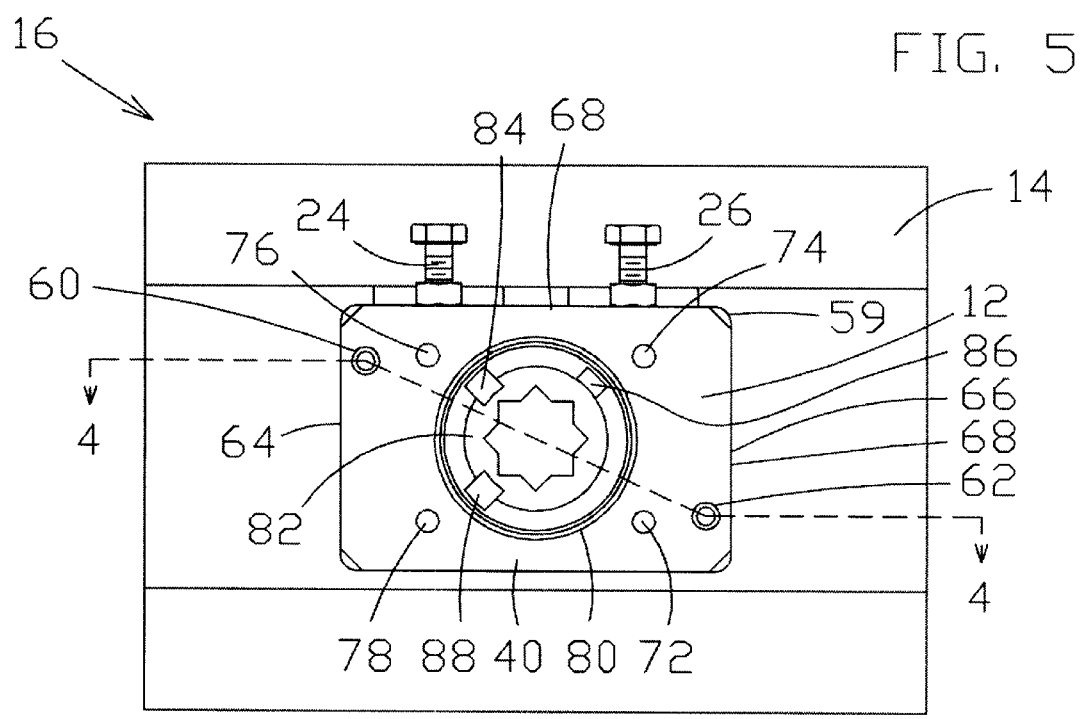
FIG. 5 is an elevational view of an actuator in accord with the present invention showing a stop assembly housing mounted to the actuator housing.

FIG. 3, FIG. 4, and FIG. 5 show the structural relationship between rotary shaft 18, actuator housing 14, and stop assembly housing 12. Referring to FIG. 3, a preferred rotary actuator shaft 18 is shown which may be rotated by gear teeth 42 and corresponding gear teeth on the pistons and/or piston shaft (not shown). In a preferred embodiment, rotary actuator shaft 18 is supported by three bearings including top bearing 44 which may preferably be a split bearing for supporting actuator shaft 18 on one side of actuator housing 14. Actuator shaft 18 extends through pressurized zone 58 of actuator housing 14 and may, as shown in FIG. 4, extend through both sides of actuator housing 14. Actuator shaft 18 is sealed adjacent bearing 44 by seal 48, which may preferably be an O-ring or elastomeric seal. Retaining clip 50 and corresponding rubbing ring 52 may be used to secure the axial position of actuator shaft 18 with respect to actuator housing 14 while permitting rotation of actuator shaft 18.

Actuator shaft 18 is also supported by lower bearing 54 on the opposite side of actuator housing 14 from bearing 44. Lower seal 56, which may preferably be an elastomeric or O-ring seal, seals around actuator shaft 18 adjacent to bearing 44. In a preferred embodiment, lower bearing 54 is provided within actuator housing 14 adjacent to stop assembly housing 12 and directly adjacent to one side of cam 20. Another bearing 58 is preferably provided within stop assembly housing 12 on the opposite side of cam 20 from lower bearing 54. The use of bearing 54 and bearing 58 on either side of cam 20 ensures that no deflection of actuator shaft 18 will occur even under maximum applied loads. Thus, forces applied to cam 20 by stop adjustment members 24 and 26 against corresponding stop surfaces 22 and 23 will not cause deflection of actuator shaft 18.

It will also be seen from FIG. 4 that stop assembly housing 12 is preferably outside of pressure zone 58 which is sealed by seal 56. Thus, stop assembly housing 12 and the related components including stop adjustment members 24 and 26 as well as cam 20 with associated stop surfaces 22 and 23 are all preferably positioned outside of pressurized zone 58 contained within actuator housing 14. For safety and hygienic reasons, the stop surfaces and stop members are also preferably not open to ambience so fingers cannot be inserted therein and debris is prevented from reaching the stop surfaces and stop members.

In a preferred embodiment, stop assembly housing 12 is designed to be securely supported within recess 59 in actuator housing 14. The fit between recess 59 and stop assembly housing 12 is preferably a very tight fit with tolerances in the range of about one-one thousandth of an inch. By providing a tight fit between stop assembly housing 12 and recess 59 in actuator housing 14, the connection between these components is not only very accurate but also very strong and resists torque, lateral movement, and other operating forces/stresses. In fact, in a preferred embodiment only two bolts such as bolts 60 and 62 are required because the only function of the bolts is to hold stop assembly housing 12 within recess 59. The position of stop housing 12 is already fixed. Preferably both recess 59 and sides 40, 64, 66, and 68 of stop assembly housing 12 are milled rather than cast or molded to achieve the desired accuracy of fit. In this manner, the adaptor plate, with or without the stop assembly, can be attached to the actuator housing for a more precise fit that can be made to conform with various standards such as ISO standards that are used internationally for connecting actuators to valves such that the actuator and valve shafts align precisely. Due to the costs of machining, the ability to use only two bolts to secure stop assembly housing 12 to actuator housing 14 may result in reduced machining costs, depending on the number and spacing of other holes, such as valve mounting holes 72, 74, 76, and 78 as well as alignment ring 80. The valve mounting configuration on stop assembly housing 12 can be made to suit for CEN, ISO, or customer valve mounting configuration requirements. Shaft insert 82 will also suit standards such as ISO or customer valve requirements. The availability of three key slots 84, 86, and 88 rather than just the two, in this case slots 84 and 88, allows ninety degree rotation of shaft insert 82 as desired for proper mating to the valve.

Figure 6:
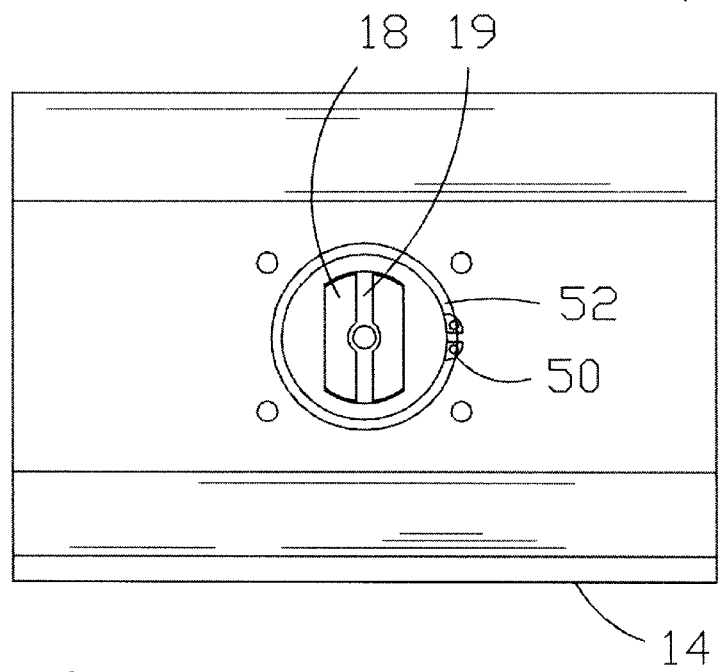
FIG. 6 is an elevational view, of an actuator with a drive shaft extending therethrough.

FIG. 6 and FIG. 7 show external views of actuator 16 including relative location of shaft 18, with valve position indicator 19 on one side of actuator housing 14, and an adaptor plate which also preferably comprises stop assembly housing 12 on the opposite side thereof.

Referring again to the drawings, and more particularly to FIG. 9 and 10, there are shown improved valve locking mechanisms 100 and 200, respectively, in accord with the present invention. Additional background details may be obtained by referring to U.S. patent application Ser. No. 09/736,618, filed Dec. 14, 2000, which is incorporated herein by reference, and which describes an exemplary dual end stop mechanism.

In a presently preferred embodiment of the present invention, the valve locking mechanism is provided externally to the valve and thereby avoids the need to modify the valve. Preferably, the valve locking mechanism is incorporated into the end stop mechanism as discussed hereinbefore. In a presently preferred embodiment, the valve locking mechanism is part of the actuator such as, conveniently, the adaptor plate between the valve and the actuator. However, the valve locking mechanism may be located at other positions in the valve actuator. Moreover, in a presently preferred embodiment, the valve locking mechanism is designed to work within a non-pressurized portion of the actuator to avoid the need for additional seals and the possibility of leaks if the seals should fail. However, the locking mechanism of the present invention could be also incorporated into pressurized regions of the actuator, if desired. For instance, except for the end stop mechanism described hereinbefore, previous end stop mechanisms have typically been incorporated into pressurized regions of the actuator. In the presently preferred embodiment, the valve locking mechanism is incorporated into the valve end stop mechanism and preferably utilizes the features of the end stop mechanism for locking purposes.

FIG. 9 discloses lock mechanism 100 which is incorporated in the dual end stop mechanism discussed in more detail hereinbefore. However, the present invention or features thereof may be utilized with or without an end stop mechanism and does not require use of the particular exemplary end stop mechanism described above. If used with an end stop mechanism, the end stop mechanism may typically include one or more adjustable members, such as 24A and 26A for setting the end stop of the valve. A dual end stop mechanism may typically include two adjustable end stop elements for setting both open and closed end stops for a valve. The end stop mechanism further includes one or more surfaces, 22 and 23, that are engaged by the adjustment members to provide end stops.

Thus, the present embodiment of locking mechanism 100, which may be a valve closed lock position depending on the particular valve construction. Lock screw 102 is preferably threaded into threaded aperture 104. Lock screw 102 may be rotated by using a screwdriver for engaging slot 106 to thereby drive lock screw 102 into a locking position as indicated. Once lock screw 102 inwardly engages stop surface 22, which surface may also be utilized as an end stop for the valve as discussed hereinbefore, the rotary actuator, and hence the valve can no longer move, i.e. the valve is locked in position as desired. Therefore, the valve locked in a selected position, which may be either a valve open position or a valve closed position and depends on the construction of the locking mechanism. For instance, locking mechanism 100 may provide a valve open locked position and locking mechanism 200 may provide a valve closed locked position. Whether it is desired to lock the valve in the open or closed position determines the specific construction of the locking mechanism. A pad lock, or dual key lock, or other types of locks may be inserted into hole 108 to thereby prevent movement of lock screw 102 or accidental or mistaken rotation thereof. When it is desired to operate the valve, the lock can be removed from hole 108 and lock screw 102 rotated to the position indicated at dashed lines 114 and 116 or until lock screw 102 engages pin or other stop member 110 whereupon cam surface 22 is no longer blocked or otherwise prevented from a movement. With lock screw 102 in the unlocked position as indicated by dashed lines 114 and 116, the valve actuator and valve can be operated. Pin 110 permits lock screw 102 to move axially with respect to hole 104 until cam surface 22 no longer engages lock screw 102. However, pin 110 prevents lock screw 102 from being removed from hole 104. Thus, it is not possible to remove lock screw 102 from hole 104 and then put a lock into lock hole 108, whereupon an observer might incorrectly believe that the valve is locked. Moreover, with the lock screw 102 in the unlocked position, hole 108 is blocked so that a padlock cannot be inserted into hole 108 so it is clear that the valve can operate. Thus, pin 110 is a safety feature that prevents inadvertent operation since the lock cannot be inserted into lock hole 108 until lock screw 102 is in engagement with stop surface 22, or stop surface 23, depending on the type of construction of the lock mechanism. In this embodiment, lock screw 102 can only be removed from inside adaptor body 12 which requires disassembly of the actuator. Note also, that cam 20 has a length such that in the embodiment of FIG. 9, stop screw 102 can only engage stop surface 22. That is, in the embodiment of FIG. 9, stop screw cannot be inserted when the valve is in the other position to engage surface 23. Thus, locking mechanism 100 preferably locks the valve into only one safety position which is either the closed valve position or the open valve position.

Thus, in a preferred embodiment, locking mechanisms 100 and 200 are constructed to lock in one position either open or closed and it is anticipated that the desired type of valve lock, either open or closed, must be specified in the order for the actuator. FIG. 9 shows an embodiment 100 of the locking mechanism which may be a closed valve position. FIG. 10 shows an embodiment 200 of the locking mechanism which may be an open valve position.

The end 112 of lock screw 102 may or may not be threaded as desired. Thus, if there is a possibility of thread damage due to engagement with surface 22 or 23, then end 112 may simply be a smooth surface whereas hole 104 and at least a portion of the length of lock screw 102 is preferably threaded. However, other axial securing means for lock screw 102 could be utilized such as rachets or the like. As discussed above, the valve operate position of lock screw 102 occurs when lock screw 102 is preferably threaded outwardly from cam 20 into hole 108 after the pad lock or other locking means is removed from hole 108.

Thus, in a presently preferred embodiment, lock screw 102 is utilized as part of the end stop mechanism. However, it will be understood that the construction utilized for lock screw 102, hole 104, hole 108, and pin 110, could be used with other components of an actuator besides the end stop mechanism, such as for instance directly engaging the actuator piston. For instance, referring to FIG. 11, lock screw 120 when in the locked position might be screwed against the actuator piston 122. Lock hole 124 may be utilized for a pad lock. Stop housing 126 provides seals for actuator housing 14 and prevents lock screw 120 form being removed. Element 136 may be a pad lock, a dual key lock, or any other type of locking mechanism that can be inserted into hole 108, 124, or 132.

Figure 11:
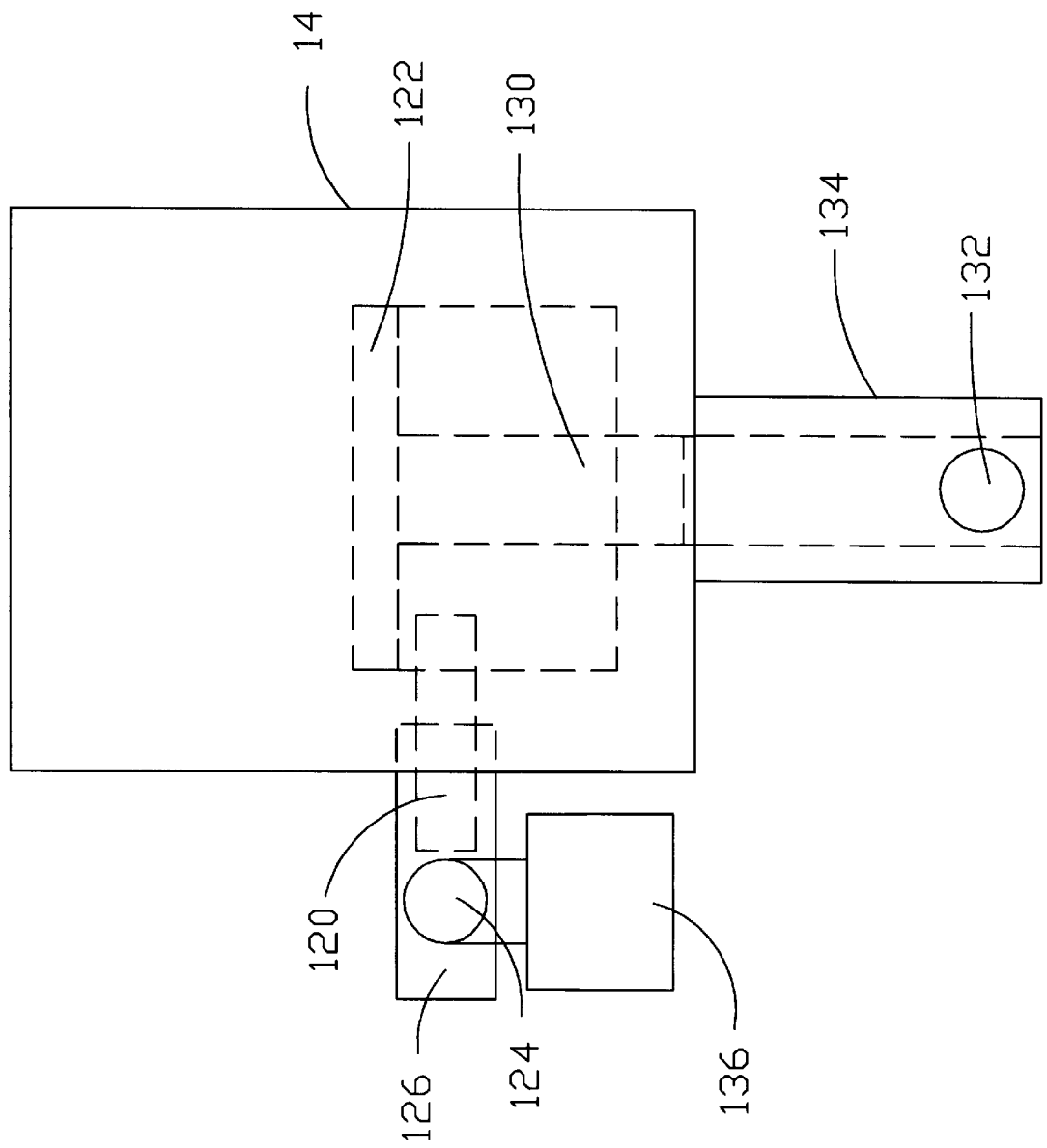
FIG. 11 is an elevational view, partially in phantom lines, of an alternate embodiment lock mechanism in accord with the present invention which can be utilized within an actuator housing for locking the actuator piston.

In the embodiment of FIG. 11, lock screw 120 moves inwardly and outwardly in a direction transverse to piston movement. In another embodiment also illustrated in FIG. 11, a different lock screw 130 might be utilized which moves inwardly and outwardly substantially in the same direction of movement as piston 122. Pad lock hole 132 is utilized for locking the lock screw in position and housing 134 prevents lock screw 130 from being removed as well as provides seals. Thus, some of the same features discussed hereinbefore for a preferred embodiment valve lock mechanism may be utilized in pressurized zones of the an actuator and/or operate with other moving actuator elements besides the end stop mechanism.

The foregoing disclosure and description of the invention is illustrative and explanatory thereof, and it will be appreciated by those skilled in the art, that various changes in the size, shape and materials, the use of mechanical equivalents, as well as in the details of the illustrated construction or combinations of features of the various elements may be made without departing from the spirit of the invention. It will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be greatly different from that shown and still operate within the spirit of the invention as described hereinbefore and in the appended claims. It will be seen that various changes and alternatives may be used that are contained within the spirit of the invention.

It is noted that the embodiment of the improved valve locking mechanism described herein in detail for exemplary purposes is of course subject to many different variations in structure, design, application and methodology. For instance, the valve lock may also comprise a stop element such that the valve lock locks the valve in one position but provides a stop for an actuator element in another position. Other types of external locking mechanisms besides pad locks or dual key locks may be utilized. The stop elements may be part of a rotary shaft, machined into the rotary shaft, or be separate from the rotary shaft, and the valve lock may or may not utilize the stop elements to lock the actuator, and therefore the valve, in position. Therefore, because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A locking mechanism operable for locking and unlocking a rotary valve actuator, said rotary valve actuator comprising a rotary shaft rotatable between a first rotary position and a second rotary position, said locking mechanism comprising:
   a rotary valve actuator member connected for movement with said rotary shaft, said rotary valve actuator member having a first stop surface;
   a valve lock element, said valve lock element being moveable between a valve operate position and a valve locked position, said valve lock element lockingly engaging said rotary valve actuator member in said valve locked position to prevent rotation of said rotary shaft between said first rotary position and said second rotary position;
   an adaptor plate for said rotary valve actuator, said valve lock element being mounted within said adaptor plate; and
   a first adjustable stop member mounted within said adaptor plate to adjustably determine said first rotary position when said valve lock element is in said valve operate position.

2. The locking mechanism of claim 1, wherein said first adjustable stop member is engageable with said first stop surface to limit rotational movement of said rotary shaft.

3. The locking mechanism of claim 1, wherein said rotary valve actuator is integral with said rotary valve actuator member such that said rotary shaft and said rotary valve actuator element are monolithically constructed as a single solid metallic structure to form a monolithic rotary shaft, said monolithic rotary shaft extending completely through said housing.

4. The locking mechanism of claim 1, further comprising:
   a first bearing for supporting said rotary shaft mounted within said adaptor plate.

5. The locking mechanism of claim 4, further comprising:
   a second bearing for supporting said rotary shaft mounted within said adaptor plate.

6. The locking mechanism of claim 1, further comprising a second stop surface affixed to said rotary valve actuator member, and a second adjustable stop member whereby said second adjustable stop member is engageable with said second stop surface.

7. The locking mechanism of claim 1, wherein said valve lock element engages said first stop surface in said valve lock position.

8. The locking mechanism of claim 1, said adaptor plate defining only one lock hole for an insertable locking device, said lock hole being positioned such that when said insertable locking device is inserted within said lock hole then said valve lock element must be in said valve lock position.

9. A valve locking mechanism operable for locking a rotary valve actuator into a selected position, said rotary valve actuator comprising an moveable actuator element moveable between a first position and a second position, said valve locking mechanism being operable in conjunction with an insertable locking device, said valve locking mechanism comprising:
   a housing;
   a valve lock element moveable within said housing along a path defined within said housing, said valve lock element being moveable between a valve operate position and a valve locked position, said valve lock element being in contact with said moveable actuator element of said rotary actuator in said valve locked position to thereby prevent movement of said moveable actuator element between said first position and said second position; and
   said housing defining only one lock hole through said path for said insertable locking device, said lock hole being positioned along said path such that when said insertable locking device is inserted within said lock hole then said valve lock element must be in said valve lock position and said valve lock element is prevented from moving from said valve locked position to said valve operate position.

10. The locking mechanism of claim 9, wherein said valve lock element blocks said lock hole for said insertable locking device when said valve lock element is in said valve operate position.

11. The locking mechanism of claim 9, wherein first and second stop members are mounted in said housing to permit adjustment of said first rotary position and said second rotary position.

12. The locking mechanism of claim 9, further comprising at least one bearing mounted within said housing for supporting said moveable actuator element.

13. The locking mechanism of claim 9, further comprising a rotary shaft for said rotary valve actuator that is integral with said moveable element such that said rotary shaft and said moveable element are monolithically constructed as a single solid metallic structure to form a monolithic rotary shaft, said monolithic rotary shaft extending completely through said housing.

14. A method for assembling a valve locking assembly operable for locking a rotary valve actuator into a selected position, said rotary valve actuator comprising a moveable actuator element which is moveable between a first position and a second position, said method comprising:
   mounting a locking element within a housing for movement along a path defined within said housing between a valve locked position and a valve operate position;
   providing that said actuator moveable element is prevented from movement between said first position and said second position when said locking element is in said valve locked position;
   mounting a retainer along said path to limit movement of said locking element;
   mounting said locking element within a valve adaptor housing; and
   mounting at least one bearing within said valve adaptor housing for supporting said moveable actuator element.

15. The method of claim 14, further comprising:
   mounting at least two bearings within said valve adaptor housing for supporting said moveable actuator element.

16. The method of claim 14, further comprising:
   mounting at least one stop member within said valve adaptor housing operable for controlling at least one of said first position and said second position when said locking element is in said valve operate position.

17. The method of claim 14, further comprising:
providing that said moveable element is integral with an actuator rotary shaft so as to be monolithically constructed as a single solid metallic structure forming a monolithic rotary shaft, and providing that said monolithic rotary shaft extends completely through said housing.

18. The method of claim 14, further comprising:
providing that said housing defines only one lock hole through said path for an insertable locking device, providing that said lock hole is positioned along said path such that when said insertable locking device is inserted within said lock hole then said valve lock element must be in said valve lock position.

19. The method of claim 18, further comprising:
mounting first and second adjustable stop members within said housing adjustably controlling said first position and said second position.

20. A valve locking mechanism operable for locking a rotary valve actuator into a selected position, said rotary valve actuator comprising a moveable actuator element moveable between a first position and a second position, said valve locking mechanism comprising:
a housing for said moveable element;
a rotary shaft for said rotary valve actuator that is integral with said moveable element such that said rotary shaft and said moveable element are monolithically constructed as a single solid metallic structure to form a monolithic rotary shaft, said monolithic rotary shaft extending completely through said housing; and
a valve lock element moveable within said housing between a valve operate position and a valve locked position, said valve lock element being in contact with said moveable actuator element of said rotary actuator in said valve locked position to thereby prevent movement of said moveable actuator element between said first position and said second position, said valve lock element having a clearance relationship with respect to said moveable actuator element of said rotary actuator in said valve operate position such that said valve lock element permits movement of said moveable actuator element between said first position and said second position.

21. The valve locking mechanism of claim 20, further comprising:
said housing defining a lock hole through said path suitable for an insertable locking device, said lock hole being positioned along said path such that when said insertable locking device is inserted within said lock hole then said valve lock element is prevented from moving from said valve locked position to said valve operate position.

22. The locking mechanism of claim 21, wherein said valve lock element blocks said lock hole for said insertable locking device when said valve lock element is in said valve operate position.

23. The locking mechanism of claim 20, further comprising:
a bearing mounted within said housing for supporting said monolithic rotary shaft.

24. The locking mechanism of claim 20, further comprising:
first and second stop members mounted in said housing for determining said first position and said second position with said valve lock element in said valve operate position.

25. The locking mechanism of claim 24, wherein said first and second stop members are adjustable.

26. The locking mechanism of claim 24, wherein said valve lock element is disposed outside of said pressure containment region.

27. The locking mechanism of claim 20, wherein said housing comprises an adaptor plate.

28. A locking mechanism operable for locking and unlocking a rotary valve actuator, said rotary valve actuator comprising a rotary shaft rotatable between a first rotary position and a second rotary position, said locking mechanism comprising:
a first rotary valve actuator member connected for movement with said rotary shaft, said first rotary valve actuator member having a first stop surface;
a valve lock element, said valve lock element being moveable between a valve operate position and a valve locked position, said valve lock element lockingly engaging said first rotary valve actuator member in said valve locked position to prevent rotation of said rotary shaft between said first rotary position and said second rotary position; and
an actuator housing for said rotary actuator, said actuator housing defining a pressure containment region sealed for containing pressure, wherein said valve lock element is disposed within said pressure containment region.

29. A locking mechanism operable for locking and unlocking a rotary valve actuator, said rotary valve actuator comprising a rotary shaft rotatable between a first rotary position and a second rotary position, said locking mechanism comprising:
a first rotary valve actuator member connected for movement with said rotary shaft, said first rotary valve actuator member having a first stop surface, said first rotary valve actuator member comprises a piston operatively connected to said rotary shaft; and
a valve lock element, said valve lock element being moveable between a valve operate position and a valve locked position, said valve lock element lockingly engaging said first rotary valve actuator member in said valve locked position to prevent rotation of said rotary shaft between said first rotary position and said second rotary position.

30. A valve locking mechanism operable for locking a rotary valve actuator into a selected position, said rotary valve actuator comprising an moveable actuator element moveable between a first position and a second position, said valve locking mechanism being operable in conjunction with an insertable locking device, said valve locking mechanism comprising:
a housing;
a valve lock element moveable within said housing along a path defined within said housing, said valve lock element being moveable between a valve operate position and a valve locked position, said valve lock element being in contact with said moveable actuator element of said rotary actuator in said valve locked position to thereby prevent movement of said moveable actuator element between said first position and said second position;
said housing defining a lock hole through said path for said insertable locking device, said lock hole being positioned along said path such that when said insertable locking device is inserted within said lock hole then said valve lock element is prevented from moving from said valve locked position to said valve operate position; and a valve lock retainer element mounted at one end of said path to restrict movement of said valve lock element and to thereby prevent removal of said valve lock element from said housing through said one end of said path.

31. A method for assembling a valve locking assembly operable for locking a rotary valve actuator into a selected position, said rotary valve actuator comprising a moveable actuator element which is moveable between a first position and a second position, said method comprising:

mounting a locking element within a housing for movement along a path defined within said housing between a valve locked position and a valve operate position;

providing that said actuator moveable element is prevented from movement between said first position and said second position when said locking element is in said valve locked position;

mounting a retainer along said path to limit movement of said locking element; and providing a hole transverse to said path within said housing for insertion of an insertable lock into said hole to prevent movement of said locking element when said locking element is in said valve locked position.

32. The method of claim 31, further comprising:

providing that said locking element blocks said hole transverse to said path to prevent said insertable lock from being inserted into said hole when said locking element is in said valve operate position.

33. A method for assembling a valve locking assembly operable for locking a rotary valve actuator into a selected position, said rotary valve actuator comprising a moveable actuator element which is moveable between a first position and a second position, said method comprising:

mounting a locking element within a housing for movement along a path defined within said housing between a valve locked position and a valve operate position;

providing that said actuator moveable element is prevented from movement between said first position and said second position when said locking element is in said valve locked position;

mounting a retainer along said path to limit movement of said locking element;

utilizing said housing as an actuator housing;

sealing said actuator housing to provide a pressure sealed zone within said actuator housing for containing pressure; and mounting said locking element within said pressure sealed zone.

34. A valve locking mechanism operable for locking a rotary valve actuator into a selected position, said rotary valve actuator comprising a moveable actuator element moveable between a first position and a second position, said valve locking mechanism comprising:

a housing for said moveable element;

a valve lock element moveable within said housing between a valve operate position and a valve locked position, said valve lock element being in contact with said moveable actuator element of said rotary actuator in said valve locked position to thereby prevent movement of said moveable actuator element between said first position and said second position, said valve lock element having a clearance relationship with respect to said moveable actuator element of said rotary actuator in said valve operate position such that said valve lock element permits movement of said moveable actuator element between said first position and said second position; and a valve lock retainer element mounted at one end of said path to restrict movement of said valve lock element and to thereby prevent removal of said valve lock element from said housing through said one end of said path.

35. A valve locking mechanism operable for locking a rotary valve actuator into a selected position, said rotary valve actuator comprising a moveable actuator element moveable between a first position and a second position, said valve locking mechanism comprising:

a housing for said moveable element; and a valve lock element moveable within said housing between a valve operate position and a valve locked position, said valve lock element being in contact with said moveable actuator element of said rotary actuator in said valve locked position to thereby prevent movement of said moveable actuator element between said first position and said second position, said valve lock element having a clearance relationship with respect to said moveable actuator element of said rotary actuator in said valve operate position such that said valve lock element permits movement of said moveable actuator element between said first position and said second position, said housing comprises an actuator housing for said rotary actuator, said actuator housing defining a pressure containment region therein sealed for containing pressure, wherein said valve lock element is disposed within said pressure containment region.

* * * * *